United States Patent
Tanaka et al.

(10) Patent No.: US 10,143,976 B2
(45) Date of Patent: Dec. 4, 2018

(54) COMPOSITE SEMIPERMEABLE MEMBRANE

(71) Applicant: TORAY INDUSTRIES, INC., Tokyo (JP)

(72) Inventors: Hiroaki Tanaka, Shiga (JP); Kazuki Sato, Shiga (JP); Takafumi Ogawa, Shiga (JP); Takao Sasaki, Shiga (JP)

(73) Assignee: TORAY INDUSTRIES, INC., Tokyo (JP)

(*) Notice: Subject to any disclaimer, the term of this patent is extended or adjusted under 35 U.S.C. 154(b) by 0 days.

(21) Appl. No.: 15/539,347

(22) PCT Filed: Dec. 25, 2015

(86) PCT No.: PCT/JP2015/086401
§ 371 (c)(1),
(2) Date: Jun. 23, 2017

(87) PCT Pub. No.: WO2016/104781
PCT Pub. Date: Jun. 30, 2016

(65) Prior Publication Data
US 2017/0368510 A1    Dec. 28, 2017

(30) Foreign Application Priority Data
Dec. 26, 2014 (JP) .................... 2014-264343

(51) Int. Cl.
*B01D 71/56* (2006.01)
*B01D 69/12* (2006.01)
(Continued)

(52) U.S. Cl.
CPC .......... *B01D 71/56* (2013.01); *B01D 61/02* (2013.01); *B01D 61/14* (2013.01);
(Continued)

(58) Field of Classification Search
None
See application file for complete search history.

(56) References Cited

U.S. PATENT DOCUMENTS 4,269,967 A * 5/1981 Elfert .................... B01D 71/56
528/337
4,277,344 A   7/1981 Cadotte
(Continued)

FOREIGN PATENT DOCUMENTS

CN   1608720 A   4/2005
CN   101244367 A   8/2008
(Continued)

OTHER PUBLICATIONS

International Search Report for PCT/JP2015/086401 (PCT/ISA/210) dated Apr. 5, 2016.
(Continued)

*Primary Examiner* — Krishnan S Menon
(74) *Attorney, Agent, or Firm* — Birch, Stewart, Kolasch & Birch LLP

(57) ABSTRACT

The present invention relates to a composite semipermeable membrane including a supporting membrane and a separation functional layer disposed on the supporting membrane, in which the separation functional layer comprises an aromatic polyamide, the aromatic polyamide has side chains and terminal groups, at least one of the side chains and terminal groups of the aromatic polyamide being an amino group, at least one of the side chains and terminal groups of the aromatic polyamide is a substituent having a structure represented by formula (1): —NXY or formula (2): —NXYZ, and in the aromatic polyamide, a content A of substituents having structures represented by formula (1) and formula (2) and a content B of amide groups satisfy $0.005 \leq A/B \leq 0.15$.

2 Claims, 1 Drawing Sheet

(51) Int. Cl.

| | |
|---|---|
| *B01D 67/00* | (2006.01) |
| *B01D 69/10* | (2006.01) |
| *C08G 69/26* | (2006.01) |
| *C08G 69/46* | (2006.01) |
| *B01D 61/02* | (2006.01) |
| *B01D 61/14* | (2006.01) |

(52) U.S. Cl.
CPC ......... *B01D 67/0093* (2013.01); *B01D 69/10* (2013.01); *B01D 69/12* (2013.01); *B01D 69/125* (2013.01); *C08G 69/26* (2013.01); *C08G 69/46* (2013.01); *B01D 2325/30* (2013.01)

(56) References Cited

U.S. PATENT DOCUMENTS

| | | | |
|---|---|---|---|
| 4,761,234 | A | 8/1988 | Uemura et al. |
| 2004/0256309 | A1 | 12/2004 | Tomioka et al. |
| 2008/0203013 | A1 | 8/2008 | Zhao et al. |
| 2012/0248027 | A1 | 10/2012 | Sasaki et al. |
| 2012/0305473 | A1 | 12/2012 | Ogawa et al. |
| 2013/0126419 | A1 | 5/2013 | Ogawa et al. |
| 2013/0256215 | A1 | 10/2013 | Nakatsuji et al. |
| 2014/0231338 | A1 | 8/2014 | Takaya et al. |
| 2014/0339152 | A1 | 11/2014 | Okabe et al. |
| 2016/0008773 | A1 | 1/2016 | Yoneda et al. |
| 2017/0203262 | A1 | 7/2017 | Nakatsuji et al. |

FOREIGN PATENT DOCUMENTS

| | | | |
|---|---|---|---|
| CN | 102665881 | A | 9/2012 |
| CN | 102781560 | A | 11/2012 |
| CN | 103025412 | A | 4/2013 |
| CN | 103260733 | A | 8/2013 |
| CN | 103638832 | A | 3/2014 |
| CN | 103842062 | A | 6/2014 |
| CN | 104053495 | A | 9/2014 |
| EP | 1 958 685 | A1 | 8/2008 |
| EP | 2805761 | A1 | 11/2014 |
| JP | 55-147106 | A | 11/1980 |
| JP | 62-121603 | A | 6/1987 |
| JP | 63-213208 | A | 9/1988 |
| JP | 2000-117075 | A | 4/2000 |
| JP | 2001-79372 | A | 3/2001 |
| JP | 2003-200026 | A | 7/2003 |
| JP | 2008-100214 | A | 8/2008 |
| JP | 2010-240651 | A | 10/2010 |
| JP | 5177056 | B2 | 4/2013 |
| JP | 2005-95856 | A | 4/2015 |
| WO | WO 2008/103599 | A2 | 8/2008 |
| WO | WO 2011/078047 | A1 | 6/2011 |
| WO | WO 2012/020660 | A1 | 2/2012 |
| WO | WO 2014/133130 | A1 | 9/2014 |

OTHER PUBLICATIONS

Written Opinion of the International Searching Authority for PCT/JP2015/086401 (PCT/ISA/237) dated Apr. 5, 2016.
English translation of the Written Opinion of the International Searching Authority (Form PCT/ISA/237) issued in International Application No. PCT/JP2015/086401 dated Apr. 5, 2016.
Korean Office Action issued in Korean Application No. 10-2017-7017206 dated Nov. 16, 2017, together with an English translation.
Chinese Office Action and Search Report dated Jan. 24, 2018 for Application No. 201580071043.1, along with an English translation thereof.
Extended European Search Report for Application No. 15873349.3, dated May 30, 2018.
Soice et al., "Oxidative degradation of polyamide reverse osmosis membranes: studies of molecular model compounds and selected membranes," Journal of Applied Polymer Science, vol. 90, No. 5, 2003, pp. 1173-1184.
Korean Office Action dated Jul. 29, 2018 for Application No. 10-2017-7017206 with an English translation thereof.

* cited by examiner

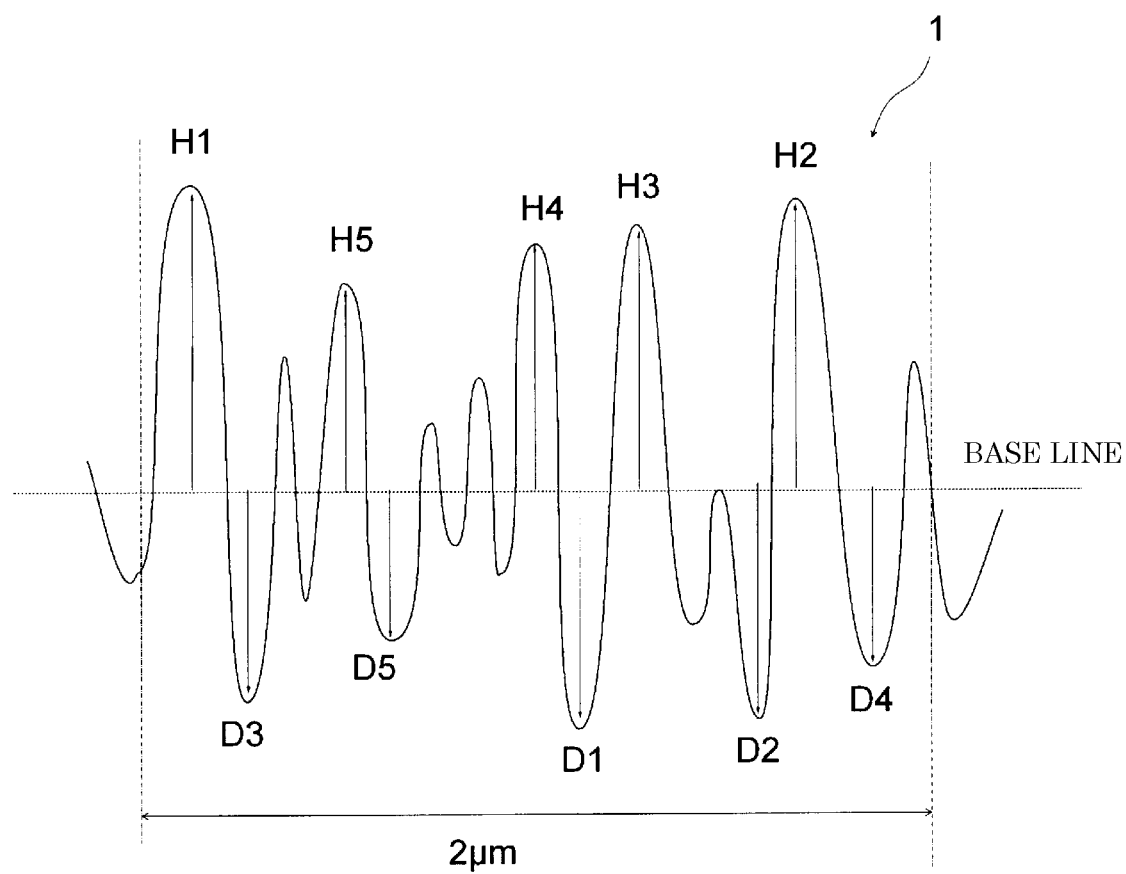

COMPOSITE SEMIPERMEABLE MEMBRANE

TECHNICAL FIELD

The present invention relates to a composite semipermeable membrane useful for selective separation of a liquid mixture, and relates to a composite semipermeable membrane having high oxidation resistance and acid resistance.

BACKGROUND ART

With respect to separation of mixtures, there are various techniques for removing substances (e.g., salts) dissolved in a solvent (e.g., water). In recent years, however, membrane separation methods are coming to be utilized increasingly as processes for energy saving and resource saving. Examples of the membranes for use in the membrane separation methods include microfiltration membranes, ultrafiltration membranes, nanofiltration membranes, and reverse osmosis membranes. These membranes are used in the case of obtaining potable water, for example, from seawater, brackish water, or water containing a harmful substance, and for producing industrial ultrapure water, wastewater treatments, recovery of valuables, etc.

Most of the reverse osmosis membranes and nanofiltration membranes that are commercially available at present are composite semipermeable membranes, and there are two kinds: ones including a microporous supporting membrane and, disposed thereover, a gel layer and an active layer formed by crosslinking a polymer; and ones including an active layer formed by condensation-polymerizing monomers on a microporous supporting membrane. Among such composite semipermeable membranes, composite semipermeable membranes (Patent Documents 1 to 4) obtained by coating a surface of a microporous supporting membrane with a separation functional layer including a crosslinked polyamide obtained by the polycondensation reaction of a polyfunctional amine with a polyfunctional acid halide are in extensive use as separation membranes having high permeability and selectively separating properties.

However, there is a problem in that in cases when composite semipermeable membranes are continuously used, the separation performance of the membranes decreases due to contact with oxidizing substances, such as free chlorine, which are contained in water to be treated. In addition, fouling substances adhere to the membrane surfaces with the lapse of use, resulting in a decrease in the permeation flux of the membranes. Although it is therefore necessary to conduct cleaning with a chemical such as an acid after performing the operation for a certain period, there is a problem in that this cleaning reduces the separation performance of the membranes.

Consequently, it is desired to develop a composite semipermeable membrane which has high oxidation resistance and changes little in membrane performance through cleaning with a chemical such as an acid, that is, has high acid resistance, in order to continue a stable operation over a long period.

In Patent Document 5 is disclosed a method in which a persulfuric acid salt is brought into contact with a composite semipermeable membrane, as a means for improving oxidation resistance. In Patent Document 6 is disclosed a method in which a cyclic ester of sulfuric acid is brought into contact with a composite semipermeable membrane, as a means for improving acid resistance.

BACKGROUND ART DOCUMENT

Patent Document

Patent Document 1: JP-A-55-147106
Patent Document 2: JP-A-62-121603
Patent Document 3: JP-A-63-218208
Patent Document 4: JP-A-2001-79372
Patent Document 5: JP-A-2008-100214
Patent Document 6: Japanese Patent No. 5177056

SUMMARY OF THE INVENTION

Problems that the Invention is to Solve

However, all the methods bring about a decrease in fresh-water production rate simultaneously with improvements in oxidation resistance and acid resistance, and no membrane which combines chemical resistance and water permeability has been obtained.

An object of the present invention is to provide a composite semipermeable membrane which is excellent in terms of oxidation resistance and acid resistance while retaining water permeability.

Means for Solving the Problems

In order to achieve the above-mentioned object, the present invention has the following configurations.

[1] A composite semipermeable membrane including a supporting membrane and a separation functional layer disposed on the supporting membrane, in which the separation functional layer includes an aromatic polyamide, the aromatic polyamide has side chains and terminal groups, at least one of the side chains and terminal groups of the aromatic polyamide being an amino group, at least one of the side chains and terminal groups of the aromatic polyamide is a substituent having a structure represented by formula (1): —NXY or formula (2): —NXYZ, and in the aromatic polyamide, a content A of substituents having structures represented by formula (1) and formula (2) and a content B of amide groups satisfy 0.005≤A/B≤0.15, provided that, in formula (1) and formula (2), N is a nitrogen atom, and at least one selected from X, Y, and Z is any of O, OH, a benzenesulfonyl group, a methanesulfonyl group, a p-toluenesulfonyl group and an o-nitrobenzenesulfonyl group, the remainder of the X, Y, and Z being a hydrogen atom.

[2] The composite semipermeable membrane according to [1], in which the aromatic polyamide is formed by interfacial polycondensation of a polyfunctional aromatic amine with a polyfunctional carboxylic acid derivative, and in the aromatic polyamide, the content A of the substituents having structures represented by formula (1) and formula (2), the content B of amide groups, a content C of terminal carboxyl groups, and a content D of terminal amino groups satisfy 1.3≤B/(A+C+D).

[3] The composite semipermeable membrane according to [1] or [2], in which the substituents having structures represented by formula (1) and formula (2) are each any of a nitro group, a nitroso group, and a hydroxylamino group.

[4] The composite semipermeable membrane according to any one of [1] to [3], in which the aromatic polyamide has a partial structure represented by the following formula (3):

[Chem. 1]

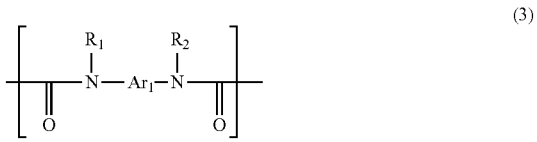

in which $Ar_1$ is an aromatic ring having 6-14 carbon atoms and having at least one substituent which satisfies Hammett's substituent constants $\sigma_m \geq 0.40$ and $\sigma_p \geq 0.50$, and $R_1$ and $R_2$ are each a hydrogen atom or an organic chain having 1-10 carbon atoms.

[5] The composite semipermeable membrane according to any one of [1] to [4], in which the aromatic polyamide has a partial structure represented by the following formula (4):

[Chem. 2]

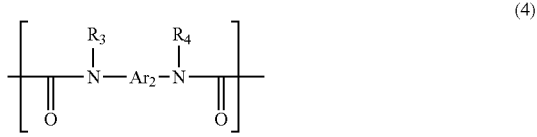

(4)

in which $Ar_2$ is an aromatic ring having 6-14 carbon atoms and having at least one substituent which is not a hydrogen atom and satisfies Hammett's substituent constants $\sigma_m \leq 0.15$ and $\sigma_p \leq 0.15$, and $R_3$ and $R_4$ are each a hydrogen atom or an organic chain having 1-10 carbon atoms.

[6] The composite semipermeable membrane according to [4] or [5], in which the substituent possessed by the partial structure represented by formula (3) is a substituent capable of being converted from a substituent satisfying Hammett's substituent constants $\sigma_m \leq 0.15$ and $\sigma_p \leq 0.15$, by an oxidation reaction.

[7] The composite semipermeable membrane according to any one of [1] to [6], in which the separation functional layer including the aromatic polyamide has a protuberance structure, the protuberance structure has protrusions, and a median value of heights of the protrusions is 50 nm or larger.

Advantage of the Invention

According to the present invention, a composite semipermeable membrane having high oxidation resistance and acid resistance can be obtained without lowering the water permeability. The composite semipermeable membrane of the present invention is especially suitable for desalination of seawater or brackish water.

BRIEF DESCRIPTION OF THE DRAWINGS

FIG. 1 is a sectional view which illustrates one example of the separation functional layer.

MODE FOR CARRYING OUT THE INVENTION

I. Composite Semipermeable Membrane
(1) Supporting Membrane

In the present embodiment, the supporting membrane includes a substrate and a porous supporting layer. However, the present invention should not be construed as being limited to that configuration, and the configuration of the supporting membrane can be changed so long as the composite semipermeable membrane has the desired strength and semipermeability. For example, the supporting membrane may include no substrate and be constituted of a porous supporting layer only.

(1-1) Substrate

Examples of the substrate include polyester-based polymers, polyamide-based polymers, polyolefin-based polymers, and mixtures or copolymers thereof. Especially preferred of these is fabric of a polyester-based polymer which is highly stable mechanically and thermally. With respect to the form of fabric, use can be advantageously made of long-fiber nonwoven fabric, short-fiber nonwoven fabric, or woven or knit fabric.

The substrate is required to have excellent suitability for membrane formation so as to avoid the following troubles: when a polymer solution is poured onto a substrate, the solution infiltrates thereinto excessively to reach to the back surface; the porous supporting layer peels off the substrate; and the membrane has defects, such as unevenness or pinholes, due to the fluffing, etc. of a substrate. Consequently, use of long-fiber nonwoven fabric is more preferred of these.

In cases when the substrate includes long-fiber nonwoven fabric configured of thermoplastic continuous filaments, it is possible to inhibit unevenness and membrane defects from occurring due to fiber fluffing during the pouring of a polymer solution as in the case of using short-fiber nonwoven fabric. Furthermore, since tension is applied in the direction of membrane formation when the composite semipermeable membrane is continuously formed, it is preferable that long-fiber nonwoven fabric having better dimensional stability should be used as the substrate. In particular, in cases when the fibers disposed on the side opposite from the porous supporting layer are longitudinally oriented with respect to the direction of membrane formation, this substrate can retain strength and be prevented from suffering membrane breakage, etc.

It is preferable that the fibers disposed in the surface of the substrate which is on the side opposite from the porous supporting layer should have a degree of fiber orientation in the range of 0°-25°. The degree of fiber orientation is an index which indicates the directions of the fibers of the nonwoven-fabric substrate constituting the supporting membrane, and that term means an average angle of the fibers constituting the nonwoven-fabric substrate in cases when the direction of membrane formation in continuous membrane formation is taken as 0° and the direction perpendicular to the membrane formation direction, i.e., the width direction of the nonwoven-fabric substrate, is taken as 90°. Consequently, the closer the degree of fiber orientation to 0°, the more the fibers are longitudinally oriented, while the closer the degree of fiber orientation to 90°, the more the fibers are transversely oriented.

Although the steps for producing the composite semipermeable membrane or the steps for producing an element include a step for heating, a phenomenon occurs in which the supporting membrane or the composite semipermeable membrane shrinks due to the heating. Especially in continuous membrane formation, this shrinkage occurs considerably in the width direction, in which no tension is being applied. Since the shrinkage poses problems concerning dimensional stability, etc., substrates having a low degree of thermal dimensional change are desirable. In cases when the nonwoven-fabric substrate is one in which the difference in the degree of orientation between the fibers disposed on the side opposite from the porous supporting layer and the fibers disposed on the side facing the porous supporting layer is 10°-90°, this substrate is effective in reducing width-direction changes due to heat and is hence preferred.

It is preferable that the substrate has an air permeability of 0.5 cc/cm²/sec to 5.0 cc/cm²/sec. In cases when the air permeability of the substrate is within that range, a polymer solution for forming the porous supporting layer infiltrates into the substrate and, hence, the porous supporting layer can have improved adhesion to the substrate, thereby heightening the physical stability of the supporting membrane.

The thickness of the substrate is preferably in the range of 10 μm to 200 μm, more preferably in the range of 30 μm to 120 μm. In this description, thickness is expressed in terms of average value unless otherwise indicated. The term "average value" herein means arithmetic average value. Specifically, the thickness of the substrate and that of the porous supporting layer are each determined through an examination of a cross-section thereof by calculating an average value of the thicknesses of 20 points measured at intervals of 20 μm along a direction (plane direction of the membrane) perpendicular to the thickness direction.

(1-2) Porous Supporting Layer

The porous supporting layer has substantially no separating performance concerning separation of ions and the like, and serves to impart strength to the separation functional layer which substantially has separating performance. The porous supporting layer is not particularly limited in the size and distribution of pores.

For example, preferred is a porous supporting layer which has even fine pores or has fine pores that gradually increase in size from the surface thereof on the side where the separation functional layer is to be formed to the surface thereof on the other side and in which the size of the fine pores as measured in the surface on the side where the separation functional layer is to be formed is 0.1 nm to 100 nm. There are no particular limitations on materials usable for the porous supporting layer and on the shapes thereof.

Usable as materials for the porous supporting layer are, for example, homopolymers and copolymers such as polysulfones, polyethersulfones, polyamides, polyesters, cellulosic polymers, vinyl polymers, poly(phenylene sulfide), poly(phenylene sulfide sulfone)s, poly(phenylene sulfone), and poly(phenylene oxide). These polymers can be used alone or as a blend thereof. Usable as the cellulosic polymers are cellulose acetate, cellulose nitrate, and the like. Usable as the vinyl polymers are polyethylene, polypropylene, poly(vinyl chloride), polyacrylonitrile, and the like.

Preferred of these, as materials for the porous supporting layer, are homopolymers and copolymers such as polysulfones, polyamides, polyesters, cellulose acetate, cellulose nitrate, poly(vinyl chloride), polyacrylonitrile, poly(phenylene sulfide), and poly(phenylene sulfide sulfone)s. More preferred examples include polysulfones, cellulose acetate, poly(phenylene sulfone), and poly(phenylene sulfide sulfone)s. Of these materials, polysulfones can be generally used since this material is highly stable chemically, mechanically, and thermally and is easy to mold.

Specifically, a polysulfone made up of repeating units represented by the following chemical formula is preferred because use of this polysulfone renders pore-diameter control of the porous supporting layer easy and this layer has high dimensional stability.

[Chem. 3]

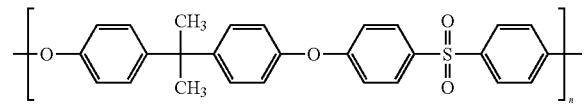

The polysulfone, when examined by gel permeation chromatography (GPC) using N-methylpyrrolidone as a solvent and using polystyrene as a reference, has a mass-average molecular weight (Mw) of preferably 10,000-200,000, more preferably 15,000-100,000.

In cases when the Mw of the polysulfone is 10,000 or higher, mechanical strength and heat resistance which are preferable for a porous supporting layer can be obtained. Meanwhile, in cases when the Mw thereof is 200,000 or less, the solution has a viscosity within an appropriate range and satisfactory formability is rendered possible.

For example, an N,N-dimethylformamide (hereinafter referred to as DMF) solution of the polysulfone is cast in a certain thickness on densely woven polyester fabric or nonwoven fabric, and the solution cast is coagulated by a wet process in water. Thus, a porous supporting layer can be obtained in which most of the surface has fine pores with a diameter of several tens of nanometers or less.

The thicknesses of the substrate and porous supporting layer affect the strength of the composite semipermeable membrane and the packing density in an element fabricated using the composite semipermeable membrane. From the standpoint of obtaining sufficient mechanical strength and sufficient packing density, the total thickness of the substrate and the porous supporting layer is preferably 30 μm to 300 μm, more preferably 100 μm to 220 μm. It is preferable that the thickness of the porous supporting layer is 20 μm to 100 μm. The thickness of the substrate and that of the porous supporting layer are each determined through an examination of a cross-section thereof by calculating an average value of the thicknesses of 20 points measured at intervals of 20 μm along a direction (plane direction of the membrane) perpendicular to the thickness direction.

The porous supporting layer can be selected from various commercial materials such as "Millipore Filter VSWP" (trade name), manufactured by Millipore Corp., and "Ultra Filter UK10" (trade name), manufactured by Toyo Roshi Ltd. However, the porous supporting layer can be produced by the method described in Office of Saline Water Research and Development Progress Report, No. 359 (1968).

(2) Separation Functional Layer

The separation functional layer includes an aromatic polyamide. The content of the aromatic polyamide in the separation functional layer is preferably 80% by weight or higher, or preferably 90% by weight or higher. The separation functional layer may be constituted substantially of an aromatic polyamide only. The expression "the separation functional layer is constituted substantially of a polyamide only" means that the content of the aromatic polyamide in the separation functional layer is 99% by weight or higher.

The thickness of the separation functional layer is usually in the range of 0.01 μm to 1 μm, preferably in the range of 0.1 μm to 0.5 μm, from the standpoint of obtaining sufficient separation performance and water permeation rate.

The polyamide which constitutes the separation functional layer is an aromatic polyamide that can be formed by interfacial polycondensation of a polyfunctional aromatic amine with a polyfunctional carboxylic acid derivative. It is preferable that at least one of the polyfunctional aromatic amine and the polyfunctional carboxylic acid derivative includes a compound having a functionality of 3 or higher.

The aromatic polyamide in the present invention is one in which at least one of the side chains and terminal groups thereof is an amino group. Furthermore, at least one of the side chains and terminal groups of the aromatic polyamide is a substituent having a structure represented by formula (1): —NXY or formula (2): —NXYZ. In formula (1) and formula (2), N is a nitrogen atom, and at least one selected from X, Y, and Z is any of O, OH, a benzenesulfonyl group, a methanesulfonyl group, a p-toluenesulfonyl group, and an o-nitrobenzenesulfonyl group. The remainder of the X, Y, and Z is a hydrogen atom.

That is, in the case where at least one of X, Y, and Z in formula (1) and formula (2) is any of O, OH, a benzenesulfonyl group, a methanesulfonyl group, a p-toluenesulfonyl group, and an o-nitrobenzenesulfonyl group, the remainder of X, Y, and Z which is not the atom or group selected from the above-described atom and substituents is a hydrogen atom. For example, in the case where X in formula (1) is an atom or group selected from the atom and substituents shown above and Y therein is not selected from those atom and substituents, then the Y is a hydrogen atom.

The presence of substituents of formula (1): —NXY and formula (2): —NXYZ in the aromatic polyamide improves the oxidation resistance and acid resistance of the aromatic polyamide.

For imparting substituents having structures of formula (1) and formula (2) to the aromatic rings of an aromatic polyamide, use may be made of either a method in which monomers that themselves have the substituents of formula (1) and formula (2) are used for constituting the aromatic polyamide or a method in which an aromatic polyamide is subjected later to a chemical action.

In the case where the monomers themselves for constituting the aromatic polyamide have substituents having structures of formula (1) and formula (2), examples of the monomers which themselves have substituents having structures of formula (1) and formula (2) include polyfunctional aromatic amines and polyfunctional carboxylic acid derivatives.

Examples of the polyfunctional aromatic amines include 2-nitrobenzene-1,3-diamine, 4-nitrobenzene-1,3-diamine, 5-nitrobenzene-1,3-diamine, 2-nitrobenzene-1,4-diamine, 2,5-dinitrobenzene-1,4-diamine, 2-nitrobenzene-1,3,5-triamine, 2,4-dinitrobenzene-1,3-diamine, 2,5-dinitrobenzene-1,3-diamine, 2,6-dinitrobenzene-1,3-diamine, 4,5-dinitrobenzene-1,3-diamine, 4,6-dinitrobenzene-1,3-diamine, 2-nitrosobenzene-1,3-diamine, 4-nitrosobenzene-1,3-diamine, 5-nitrosobenzene-1,3-diamine, 2-nitrosobenzene-1,4-diamine, 2,5-dinitrosobenzene-1,4-diamine, 2-nitrosobenzene-1,3,5-triamine, 2,4-dinitrosobenzene-1,3-diamine, 2,5-dinitrosobenzene-1,3-diamine, 2,6-dinitrosobenzene-1,3-diamine, 4,5-dinitrosobenzene-1,3-diamine, 4,6-dinitrosobenzene-1,3-diamine, 2-hydroxylaminobenzene-1,3-diamine, 4-hydroxylaminobenzene-1,3-diamine, 5-hydroxylaminobenzene-1,3-diamine, 2-hydroxylaminobenzene-1,4-diamine, 2,5-dihydroxylaminobenzene-1,4-diamine, 2-hydroxylaminobenzene-1,3,5-triamine, 2,4-dihydroxylaminobenzene-1,3-diamine, 2,5-dihydroxylaminobenzene-1,3-diamine, 2,6-dihydroxylaminobenzene-1,3-diamine, 4,5-dihydroxylaminobenzene-1,3-diamine, and 4,6-dihydroxylaminobenzene-1,3-diamine.

Examples of the polyfunctional carboxylic acid derivatives include 2-nitroisophthal dichloride, 4-nitroisophthal dichloride, 5-nitroisophthal dichloride, 2,4-dinitroisophthal dichloride, 2,5-dinitroisophthal dichloride, 2,6-dinitroisophthal dichloride, 4,5-dinitroisophthal dichloride, 4,6-dinitroisophthal dichloride, 2-nitroterephthal dichloride, 2,5-dinitroterephthal dichloride, 2-nitrobenzene-1,3,5-tricarbonyl trichloride, 2-nitrosoisophthal dichloride, 4-nitrosoisophthal dichloride, 5-nitrosoisophthal dichloride, 2,4-dinitrosoisophthal dichloride, 2,5-dinitrosoisophthal dichloride, 2,6-dinitrosoisophthal dichloride, 4,5-dinitrosoisophthal dichloride, 4,6-dinitrosoisophthal dichloride, 2-nitrosoterephthal dichloride, 2,5-dinitrosoterephthal dichloride, 2-nitrosobenzene-1,3,5-tricarbonyl trichloride, 2-hydroxylaminoisophthal dichloride, 4-hydroxylaminoisophthal dichloride, 5-hydroxylaminoisophthal dichloride, 2,4-dihydroxylaminoisophthal dichloride, 2,5-dihydroxylaminoisophthal dichloride, 2,6-dihydroxylaminoisophthal dichloride, 4,5-dihydroxylaminoisophthal dichloride, 4,6-dihydroxylaminoisophthal dichloride, 2-hydroxylaminoterephthal dichloride, 2,5-dihydroxylaminoterephthal dichloride, and 2-hydroxylaminobenzene-1,3,5-tricarbonyl trichloride. However, from the standpoint of the availability and handleability of monomers, the latter method is preferred, in which an aromatic polyamide is subjected later to a chemical action.

The content A of substituents having structures of formula (1) and formula (2) in the aromatic polyamide and the content B of amide groups in the aromatic polyamide satisfy $0.005 \leq A/B \leq 0.15$. The term "content A of substituents having structures of formula (1) and formula (2)" means the sum of the content of substituents having a structure of formula (1) and the content of substituents having a structure of formula (2). Since A/B is 0.005 or larger, substituents having higher electron-attracting properties than the amino group are present in at least a certain amount and, hence, the effect of improving the oxidation resistance and acid resistance of the aromatic polyamide can be sufficiently obtained. Meanwhile, since the ratio is 0.15 or less, the polyamide can be inhibited from increasing in hydrophobicity by the presence of the substituents having higher electron-attracting properties than the amino group and, hence, satisfactory water permeability can be rendered possible.

It is preferable that the aromatic polyamide is one in which the content A of the substituents having structures of formula (1) and formula (2), the content B of amide groups, the content C of terminal carboxyl groups, and the content D of terminal amino groups satisfy $1.3 \leq B/(A+C+D)$. In cases when $B/(A+C+D)$ is 1.3 or larger, the proportion of the content of the substituents and the content of the terminal groups to the content of amide groups is small. Because of this, the polyamide can be inhibited from increasing in hydrophobicity even when the content A of substituents having structures of formula (1) and formula (2) is high to such a degree that oxidation resistance and acid resistance can be rendered possible. Consequently, satisfactory water permeability can be rendered possible.

The expression "content A of substituents having structures of formula (1) and formula (2) in the aromatic polyamide" herein means the molar fraction (mol %) of substituents which have structures of formula (1) and formula (2) and which are present in the aromatic polyamide. This content A of the substituents can be determined from the results of analyses of the obtained separation functional layer by $^{13}C$ solid NMR spectroscopy performed by the DD/MAS method and X-ray photoelectron spectroscopy (XPS).

Meanwhile, the expression "content B of amide groups in the aromatic polyamide" means the molar fraction (mol %) of amide groups present in the aromatic polyamide; the expression "content C of terminal carboxyl groups in the aromatic polyamide" means the molar fraction (mol %) of terminal carboxyl groups present in the aromatic polyamide; and the expression "content D of terminal amino groups in the aromatic polyamide" means the molar fraction (mol %) of terminal amino groups present in the aromatic polyamide. These contents can be determined from the results of analysis of the obtained separation functional layer by $^{13}C$ solid NMR spectroscopy performed by the DD/MAS method.

From the standpoints of improving the oxidation resistance and acid resistance and ensuring satisfactory water permeability, it is especially preferable that the substituents having structures of formula (1) and formula (2) are each a nitro group, a nitroso group, or a hydroxylamino group.

The present inventors diligently made investigations and, as a result, have found that a composite semipermeable membrane having improved oxidation resistance is obtained by subjecting a polyfunctional aromatic amine including an aromatic ring having at least one substituent which is not a hydrogen atom and which satisfies Hammett's substituent constants $\sigma_m \leq 0.15$ and $\sigma_p \leq 0.15$ to an interfacial polymerization reaction and then subjecting the resultant polymer to a chemical conversion to thereby convert the functional group into an electron-attracting group which satisfies Hammett's substituent constants $\sigma_m \geq 0.40$ and $\sigma_p \geq 0.50$.

Specifically, the aromatic-polyamide functional layer is characterized in that the aromatic rings derived from the polyfunctional aromatic amine include at least one partial structure represented by structural formula (3).

[Chem. 4]

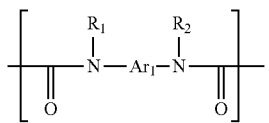

(3)

In structural formula (3), $Ar_1$ is an aromatic ring having 6-14 carbon atoms and having at least one substituent which satisfies Hammett's substituent constants $\sigma_m \geq 0.40$ and $\sigma_p \geq 0.50$, and $R_1$ and $R_2$ are each a hydrogen atom or an organic chain having 1-10 carbon atoms.

The substituent which is possessed by the $Ar_1$ shown in structural formula (3) and which satisfies Hammett's substituent constants $\sigma_m \geq 0.40$ and $\sigma_p \geq 0.50$ is introduced by performing a chemical treatment after the interfacial polycondensation reaction.

The Hammett's substituent constants were proposed by L. P. Hammett, and are values obtained by quantifying the electronic properties of substituents on aromatic rings on the basis of experimental values. The Hammett's substituent constants of the hydrogen atom, which is a reference, were taken as 0; and the larger the value thereof, the more the substituent is electron-attractive, while the smaller the value thereof, the more the substituent is electron-donative.

$\sigma_m$ indicates the effect produced when the substituent is present at a meta position, and $\sigma_p$ indicates the effect produced when the substituent is present at the para position. With respect to Hammett's substituent constants, reference can be made, for example, to C. Hansch and two others, Chemical Reviews, 91, 1991, pp. 165-195. Although substituents are specified by means of Hammett's substituent constants in this description, the present invention includes the case where Hammett's substituent constants which are not shown in the literature but have been determined experimentally are within the ranges shown above.

Examples of the substituent which satisfies Hammett's substituent constants $\sigma_m \geq 0.40$ and $\sigma_p \geq 0.50$ include cyano, nitroso, nitro, and dimethylphosphinyl groups. The presence of such substituents having Hammett's substituent constants $\sigma_m \geq 0.40$ and $\sigma_p \geq 0.50$ makes the polyamide have a reduced electron density in the amide groups and aromatic rings and have reduced reactivity with oxidizing agents including chlorine, thereby improving the oxidation resistance of the polyamide.

The aromatic polyamide in the present invention can contain a partial structure represented by formula (4).

[Chem. 5]

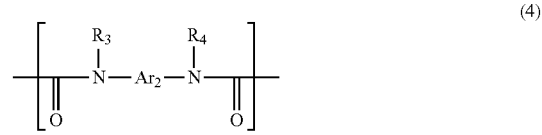

(4)

In formula (4), $Ar_2$ is an aromatic ring having 6-14 carbon atoms and having at least one substituent which is not a hydrogen atom and satisfies Hammett's substituent constants $\sigma_m \leq 0.15$ and $\sigma_p \leq 0.15$, and $R_3$ and $R_4$ are each a hydrogen atom or an organic chain having 1-10 carbon atoms. Examples of the substituent which is not a hydrogen atom and satisfies $\sigma_m \leq 0.15$ and $\sigma_p \leq 0.15$ include dimethylphosphino, methylthio, methyl, hydroxyamino, and 1-hydroxyethyl groups.

The substituent described above which is possessed by the $Ar_1$ of structural formula (3) that is contained in the polyamide and which satisfies Hammett's substituent constants $\sigma_m \geq 0.40$ and $\sigma_p \geq 0.50$ is obtained, through a chemical conversion by oxidation reaction or the like, from the substituent which satisfies Hammett's substituent constants $\sigma_m \leq 0.15$ and $\sigma_p \leq 0.15$. Examples of the substituent obtained by a chemical conversion include dimethylphosphinyl, nitroso, and nitro groups. These substituents can be induced by performing a chemical conversion after the interfacial polycondensation reaction of a polyfunctional aromatic amine having a substituent which satisfies Hammett's substituent constants $\sigma_m \leq 0.15$ and $\sigma_p \leq 0.15$ with a polyfunctional carboxylic acid derivative.

The separation functional layer formed of the crosslinked aromatic polyamide forms a protuberance structure made up of protrusions alternating with recesses. The higher the protrusions, the larger the surface area and, hence, the larger the effective membrane area, resulting in an improvement in water permeability. Meanwhile, the larger the membrane thickness in the protrusions, the lower the water permeability but the more the chemical resistance improves.

In the present invention, the median value of the heights of the protrusions of the separation functional layer is preferably 50 nm or larger, more preferably 70 nm or larger. The median value of the heights of the protrusions of the separation functional layer is preferably 1,000 nm or less, more preferably 800 nm or less. In cases when the median value of the heights of the protrusions is 50 nm or larger, a composite semipermeable membrane having sufficient water permeability can be easily obtained. In cases when the median value of the heights of the protrusions is 1,000 nm or less, the protrusions do not collapse even when the composite semipermeable membrane is used in a high-pressure operation, and stable membrane performance can be obtained.

The term "protrusions of a separation functional layer" in the present invention means the protrusions each having a height not less than one-fifth the ten-point average surface roughness. The ten-point average surface roughness is a value obtained by the following calculation method. First, a cross-section which is perpendicular to the plane of the membrane is examined with an electron microscope at the magnification shown below. In the cross-section image obtained, a surface of the separation functional layer (indicated by numeral "1" in FIG. 1) appears as a protuberance-structure curve in which protrusions alternate continuously with recesses. With respect to this curve, a roughness curve defined in accordance with ISO 4287:1997 is determined. A portion of the cross-section image which has a width of 2.0 μm along the direction of the average line for the roughness curve is extracted (FIG. 1).

The average line is a straight line which is defined in accordance with ISO 4287:1997 and which has been drawn so that the upper side of the average line and the lower side thereof are equal, over the measuring length, in the total area of regions surrounded by the average line and the roughness curve.

In the extracted image having a width of 2.0 μm, the heights of the protrusions in the separation functional layer and the depths of the recesses therein are measured using the average line as a base line. The absolute values of the heights H1 to H5 of five protrusions ranging from the highest protrusion to protrusions which gradually decrease in height to the fifth height are averaged, and the absolute values of the depths D1 to D5 of five recesses ranging from the deepest recess to recesses which gradually decrease in depth to the fifth depth are averaged. Furthermore, the two absolute values of average values obtained are summed up. The sum thus obtained is the ten-point average surface roughness.

The median value of the heights of protrusions can be determined with a transmission electron microscope.

First, a sample is embedded in a water-soluble polymer in order to produce an ultrathin section to be examined with a transmission electron microscope (TEM). The water-soluble polymer may be any water-soluble polymer capable of maintaining the shape of the sample, and use can be made, for example, of PVA or the like. Next, the embedded sample is dyed with $OsO_4$ in order to facilitate cross-section examination, and this sample is cut with an ultramicrotome to produce an ultrathin section. With respect to the ultrathin section obtained, a photograph of the cross-section is taken using a TEM. The heights of protrusions can be determined by reading the cross-section photograph using an image analysis software and analyzing the data. The heights of protrusions are values measured for protrusions each having a height not less than one-fifth the ten-point average surface roughness.

The median value of the heights of protrusions is determined in the following manner. When the cross-sections of arbitrarily selected ten portions of the composite semipermeable membrane are examined, the heights of protrusions each having a height not less than one-fifth the ten-point average surface roughness described above are measured with respect to each cross-section. Furthermore, a median value is calculated from the results of the calculation for the cross-sections of the ten portions. Thus, the median value of protrusion heights can be determined. Each of these cross-sections has a width of 2.0 μm along the direction of the average line of the roughness curve.

II. Production Processes

Next, processes for producing the composite semipermeable membrane are explained using specific examples.

The polyamide, which serves as the framework of the separation functional layer in the composite semipermeable membrane, is formed, for example, by using an aqueous solution containing the polyfunctional aromatic amine described above and an organic-solvent solution which contains a polyfunctional carboxylic acid derivative and which is immiscible with water and performing interfacial polycondensation of the polyfunctional aromatic amine with the polyfunctional carboxylic acid derivative on a surface of a supporting membrane (in the case of a supporting membrane including a substrate and a porous supporting layer, the interfacial polycondensation is performed on the surface of the porous supporting layer).

Here, the concentration of the polyfunctional aromatic amine in the aqueous solution of the polyfunctional aromatic amine is preferably in the range of 0.1-20% by weight, more preferably in the range of 0.5-15% by weight. In cases when the concentration thereof is within that range, sufficient salt removal performance and water permeability can be obtained.

The aqueous solution of the polyfunctional aromatic amine may contain, for example, a surfactant, organic solvent, alkaline compound, antioxidant, etc., so long as these ingredients do not retard the reaction between the polyfunctional aromatic amine and the polyfunctional carboxylic acid derivative. Surfactants have the effect of improving the wettability of the surface of the supporting membrane to reduce surface tension between the aqueous amine solution and nonpolar solvents. Some organic solvents act as catalysts for interfacial polycondensation reactions, and there are cases where addition thereof enables the interfacial polycondensation reaction to be conducted efficiently.

In order to perform the interfacial polycondensation of the polyfunctional aromatic amine with the polyfunctional carboxylic acid derivative on a supporting membrane, the above-described aqueous solution of the polyfunctional aromatic amine is first brought into contact with the supporting membrane. It is preferable that the aqueous solution of the polyfunctional aromatic amine is continuously brought into even contact with a surface of the supporting membrane. Specific examples of methods therefor include: a method in which the aqueous solution of the polyfunctional aromatic amine is applied to the supporting membrane; and a method in which the supporting membrane is immersed in the aqueous solution of the polyfunctional aromatic amine. The period during which the supporting membrane is in contact with the aqueous solution of the polyfunctional aromatic amine is preferably in the range of 1 minute to 10 minutes, more preferably in the range of 1 minute to 3 minutes.

After the aqueous solution of the polyfunctional aromatic amine is brought into contact with the supporting membrane, the excess solution is sufficiently removed so that no droplets remain on the membrane. By sufficiently removing the excess solution, any portions where droplets remain can be prevented from becoming membrane defects in the resulting membrane and from thereby reducing the membrane performance. As a method for removing the excess solution, use can be made, for example, of a method in which the supporting membrane which has been contacted with the aqueous solution of the polyfunctional aromatic amine is held vertically to make the excess aqueous solution flow down naturally and a method in which streams of a gas, e.g., nitrogen, are blown against the supporting membrane from air nozzles to forcedly remove the excess solution, as described in JP-A-2-78428. After the removal of the excess solution, the membrane surface can be dried to remove some of the water contained in the aqueous solution.

Subsequently, an organic-solvent solution containing a polyfunctional carboxylic acid derivative is brought into contact with the supporting membrane which has been contacted with the aqueous solution of the polyfunctional aromatic amine, and the framework of a crosslinked-polyamide separation functional layer is formed by the interfacial polycondensation.

The concentration of the polyfunctional carboxylic acid derivative in the organic-solvent solution is preferably in the range of 0.01-10% by weight, more preferably in the range of 0.02-2.0% by weight. This is because a sufficient reaction rate is obtained by regulating the concentration thereof to 0.01% by weight or higher and the occurrence of side reactions can be inhibited by regulating the concentration thereof to 10% by weight or less. Furthermore, incorporation of an acylation catalyst such as DMF into this organic-solvent solution is more preferred because the interfacial polycondensation is accelerated thereby.

It is desirable that the organic solvent is one which is water-immiscible and does not damage the supporting membrane and in which the polyfunctional carboxylic acid derivative dissolves. The organic solvent may be any such organic solvent which is inert to the polyfunctional aromatic amine compound and the polyfunctional carboxylic acid derivative. Preferred examples thereof include hydrocarbon compounds such as n-hexane, n-octane, and n-decane.

As a method for bringing the organic-solvent solution of the polyfunctional carboxylic acid derivative into contact with the aqueous-solution phase of the polyfunctional aromatic amine compound, use may be made of the same method as that for coating the supporting membrane with the aqueous solution of the polyfunctional aromatic amine.

After the organic-solvent solution of the polyfunctional carboxylic acid derivative is brought into contact as described above and the interfacial polycondensation is conducted to form a separation functional layer including a crosslinked polyamide on the supporting membrane, it is desirable to remove the excess solvent. As a method for removing the excess solvent, use can be made, for example, of a method in which the membrane is held vertically to make the excess organic solvent flow down naturally, thereby removing the excess organic solvent. In this case, the time period during which the membrane is held vertically is preferably in the range of 1 minute to 5 minutes, more preferably in the range of 1 minute to 3 minutes. Too short time periods thereof result in insufficient formation of the separation functional layer, while too long time periods thereof result in excess removal of the organic solvent and tend to develop defects and cause a decrease in performance.

The composite semipermeable membrane obtained by the process described above may be subjected, for example, to a step in which the composite semipermeable membrane is treated with hot water at a temperature in the range of 40-100° C., preferably in the range of 60-100° C., for 1 minute to 10 minutes, more preferably 2 minutes to 8 minutes. Thus, the solute rejection performance and water permeability of the composite semipermeable membrane can be further improved.

Next, an explanation is given on the method in which an aromatic polyamide is subjected later to a chemical action to impart substituents having structures of formula (1) and formula (2) to the aromatic rings of the aromatic polyamide.

There are two ways in which structures of formula (1) and formula (2) are imparted as aromatic-ring substituents to a polyamide. One is a method in which monomer-derived substituents are converted, and the other is a method in which unsubstituted aromatic rings are substituted. Preferred from the standpoint of ease of controlling the conversion and substitution positions is the method in which monomer-derived substituents are converted.

In the method in which monomer-derived substituents are converted, an oxidation reaction is utilized in the case of conversion into nitro groups, hydroxylamino groups, or nitroso groups. Although general oxidizing agents such as water-soluble peroxides can be used for the oxidation reaction, the oxidizing agent for the oxidation reaction is preferably a persulfuric acid compound, more preferably potassium peroxysulfate, from the standpoint of reactivity with the aromatic polyamide.

There are no particular limitations on means of reacting the oxidizing agent with the polyamide. However, it is preferred to immerse the composite semipermeable membrane of a polyamide in an aqueous solution of the oxidizing agent in order to sufficiently conduct the reaction. In this case, it is also preferred to heighten the efficiency of the reaction by stirring.

The concentration of the oxidizing agent is preferably 0.1-10% by weight, more preferably 0.5-3% by weight.

The pH of the aqueous solution of the oxidizing agent is not particularly limited so long as the oxidizing ability of the oxidizing agent can be sufficiently exhibited. It is, however, preferable that the pH thereof is in the range of 1.5-7.0.

The period during which the aqueous oxidizing agent solution is in contact with the polyamide is preferably 30 seconds to 60 minutes. From the standpoint of converting amino groups to such a degree that the oxidation resistance and acid resistance of the polyamide and water permeability are both attained, the period thereof is more preferably 1 minute to 30 minutes.

After the contact with the oxidizing agent, the polyamide composite membrane is brought into contact with a reducing agent in order to terminate the oxidation reaction. This reducing agent is not particularly limited so long as the reducing agent undergoes an oxidation/reduction reaction with the oxidizing agent used. However, from the standpoints of availability and handleability, it is preferred to use any of sodium hydrogen sulfite, sodium sulfite, and sodium thiosulfate. It is also preferred to use such reducing agents as 0.01-1% by weight aqueous solutions.

The period during which the composite membrane is in contact with the reducing agent is not limited so long as the oxidation reaction is terminated and the structure of the polyamide does not change. Usually, an immersion period of 1 minute to 20 minutes is preferred. In case where the period thereof is too long, the structure of the polyamide is changed by the reducing agent and this change may cause a decrease in performance.

After the contact with the reducing agent, it is preferred to rinse the polyamide composite membrane with water in order to remove the reducing agent remaining on or in the membrane.

In the case where the monomer-derived substituents are amino groups, it is possible to sulfonate the amino groups into benzenesulfonamide groups, methanesulfonamide groups, p-toluenesulfonamide groups, or o-nitrobenzenesulfonamide groups. Specifically, the sulfonation is conducted by the reaction of a halide of benzenesulfonic acid, methanesulfonic acid, p-toluenesulfonic acid, or o-nitrobenzenesulfonic acid with the amino groups. It is preferable that the halide is the chloride, from the standpoints of availability and handleability.

Such a sulfonyl halide is used as a solution in an organic solvent. The organic solvent is not limited so long as the organic solvent does not affect the structure of the polyamide and the sulfonyl halide is soluble therein.

The reaction between a solution of a sulfonyl halide and the polyamide may be performed by immersing the composite semipermeable membrane of the polyamide in the aqueous solution as in the case of using an aqueous oxidizing agent solution described above. Alternatively, the reaction may be conducted by sandwiching the solution of a sulfonyl halide between the composite semipermeable membrane and a film to infiltrate the solution into the surface of the composite semipermeable membrane.

The period during which the sulfonyl halide solution is reacted with the polyamide is preferably 30 seconds to 60 minutes. From the standpoint of converting the amino groups to such a degree that the oxidation resistance and acid resistance of the polyamide and water permeability are both attained, the period thereof is more preferably 30 seconds to 10 minutes.

After the reaction, it is preferred to rinse off the sulfonyl halide solution with water or an organic solvent in order to terminate the reaction, as in the case described above.

The aromatic polyamide in the present invention is one in which at least one of the side chains and terminal groups thereof is an amino group and in which at least one of the side chains and terminal groups thereof is a substituent having a structure of formula (1): —NXY or formula (2): —NXYZ. Furthermore, the aromatic polyamide in the present invention has substituents having structures represented by formula (1) and formula (2) in an amount in the range of 0.005≤(content of the substituents having structures of formula (1): —NXY and formula (2): —NXYZ)/(content of amide groups)≤0.15. In case where the substituents are contained in amounts less than the lower limit, the improvements in the acid resistance and oxidation resistance of the polyamide composite membrane are too small. In case where the substituents are contained in amounts larger than the upper limit, the polyamide undesirably has enhanced hydrophobicity, resulting in a decrease in water permeability.

The (content of substituents having structures of formula (1): —NXY and formula (2): —NXYZ)/(content of amide groups) mentioned above can be determined, for example, by analyzing the polyamide by X-ray photoelectron spectroscopy (XPS), specifically, the X-ray photoelectron spectroscopy (XPS) shown as an example in Journal of Polymer Science, Vol. 26, 559-572 (1988) and Nihon Setchaku Gakkai Shi (Journal of The Adhesion Society of Japan), Vol. 27, No. 4 (1991), and by analyzing the separation functional layer by the $^{13}$C solid NMR spectroscopy which will be described later.

Specifically, the results obtained by XPS are limited to ones concerning the ratio of the content of substituents having structures of formula (1): —NXY and formula (2): —NXYZ to total nitrogen. Consequently, the (content of substituents having structures of formula (1): —NXY and formula (2): —NXYZ)/(content of amide groups) can be calculated from those results combined with functional-group content ratios determined by $^{13}$C solid NMR spectroscopy.

In the present invention, it is preferable that the aromatic polyamide is one in which the content A of the substituents having structures of formula (1) and formula (2), the content B of amide groups, the content C of terminal carboxyl groups, and the content D of terminal amino groups satisfy 1.3≤B/(A+C+D). In cases when B/(A+C+D) is 1.3 or larger, the proportion of the content of the substituents and the content of the terminal groups to the content of amide groups is small. Because of this, the polyamide can be inhibited from increasing in hydrophobicity even when the content A of the substituents having structures of formula (1) and formula (2) is high to such a degree that oxidation resistance and acid resistance can be rendered possible. Consequently, satisfactory water permeability can be rendered possible.

Here, the proportions of carboxyl groups, amino groups, amide groups, and substituents having structures of formula (1) and formula (2) can be determined by analysis of the separation functional layer by $^{13}$C solid NMR spectroscopy. Specifically, the substrate is peeled from 5 m$^2$ of the composite semipermeable membrane to obtain the polyamide separation function layer and the porous supporting layer. Thereafter, the porous supporting layer is dissolved away, thereby obtaining the polyamide separation functional layer. The polyamide separation functional layer obtained is examined by DD/MAS $^{13}$C solid NMR spectroscopy. The proportions can be calculated from comparisons among the integrals of peaks for the carbon atoms of the respective functional groups or the integrals of peaks for carbon atoms to which the respective functional groups have been bonded.

The thus-formed composite semipermeable membrane of the present invention is suitable for use as a spiral type composite semipermeable membrane element produced by winding the composite semipermeable membrane around a cylindrical water collection tube having a large number of perforations, together with a raw-water channel member such as a plastic net and a permeate channel member such as tricot and optionally with a film for enhancing pressure resistance. Furthermore, such elements can be connected serially or in parallel and housed in a pressure vessel, thereby configuring a composite semipermeable membrane module.

Moreover, the composite semipermeable membrane or the element or module thereof can be combined with a pump for supplying raw water thereto, a device for pretreating the raw water, etc., thereby configuring a fluid separator. By using this fluid separator, raw water can be separated into a permeate such as potable water and a concentrate which has not passed through the membrane. Thus, water suited for a purpose can be obtained.

Higher operation pressures for the fluid separator are effective in improving the salt removal ratio. However, in view of the resultant increase in the amount of energy necessary for the operation and in view of the durability of the composite semipermeable membrane, the operation pressure at the time when water to be treated is passed through the composite semipermeable membrane is preferably 1.0 MPa to 10 MPa. With respect to the temperature of the feed water, the salt removal ratio decreases as the temperature thereof rises. However, as the temperature thereof declines, the membrane permeation flux decreases. Consequently, the temperature thereof is preferably 5-45° C. Meanwhile, with respect to the pH of the feed water, too high pH values thereof result in a concern that, in the case of feed water having a high salt concentration, such as seawater, scale of magnesium or the like might occur. There also is a concern that the membrane might deteriorate due to the high-pH operation. Consequently, it is preferred to operate the fluid separator in a neutral range.

Examples of the raw water to be treated with the composite semipermeable membrane according to the present invention include liquid mixtures having a TDS (total dissolved solids) of 500 mg/L to 100 g/L, such as seawater, brackish water, and wastewater. In general, TDS means the total content of dissolved solids, and is expressed in terms of "weight/volume" or "weight ratio". According to a definition, the content can be calculated from the weight of a residue obtained by evaporating, at a temperature of 39.5-40.5° C., a solution filtered through a 0.45-μm filter. However, a simpler method is to convert from practical salinity (S).

Although the composite semipermeable membrane of the present invention has high oxidation resistance and acid resistance, an appropriate index to oxidation resistance is resistance to an aqueous sodium hypochlorite solution having a pH regulated to a value around, for example, neutral, more specifically 6.0-8.0. This is because the free chlorine which generates from the hypochlorous acid is a representative oxidizing substance contained in the raw water described above.

With respect to an index to acid resistance, an appropriate index is resistance to an aqueous sulfuric acid solution having a pH of 1. This is because the conditions of pH 1 are severer acidic conditions than the pH during acid cleaning in membrane filtration operations and, hence, to show resistance to an aqueous sulfuric acid solution having a pH of 1 ensures that this membrane is less apt to deteriorate even when subjected to acid cleaning multiple times.

EXAMPLES

The present invention is explained below in more detail by reference to Examples.

Various properties of the composite semipermeable membranes in Comparative Examples and Examples were determined by feeding seawater regulated so as to have a temperature of 25° C. and a pH of 6.5 (TDS concentration, about 3.5%) to each composite semipermeable membrane at an operation pressure of 5.5 MPa to conduct a membrane filtration treatment and examining the permeate and the feed water for quality (Comparative Examples 1 to 5 and Examples 1 to 6). Alternatively, a 2,000 mg/L aqueous NaCl solution regulated so as to have a temperature of 25° C. and a pH of 7 was fed to the composite semipermeable membrane at an operation pressure of 1.55 MPa to conduct a membrane filtration treatment for 24 hours, and the permeate obtained thereafter and the feed water were examined for quality to thereby determine the various properties (Comparative Example 7 and Examples 7 and 8).

(Content of substituents having structures of formula (1): —NXY and formula (2): —NXYZ)/(content of amide groups) and (content of amide groups)/[(content of terminal amino groups)+(content of terminal carboxyl groups)+(content of substituents having structures of formula (1) and formula (2))]

The substrate was physically peeled from 5 m$^2$ of each composite semipermeable membrane to recover the porous supporting layer and the separation functional layer. The layers recovered were allowed to stand still at 25° C. for 24 hours to thereby dry the layers. Thereafter, the dried layers were introduced little by little into a beaker containing dichloromethane, and the mixture was stirred to dissolve the polymer constituting the porous supporting layer. The insoluble matter in the beaker was recovered with filter paper. This insoluble matter was introduced into a beaker containing dichloromethane, the mixture was stirred, and the insoluble matter in the beaker was recovered. This operation was repeated until the dissolution of the polymer constituting the porous supporting layer in the dichloromethane became not detectable. The separation functional layer recovered was dried with a vacuum dryer to remove the remaining dichloromethane. The separation functional layer obtained was freeze-pulverized to thereby obtain a powdery sample. This sample was put into a sample tube for solid NMR spectroscopy, and the sample tube was closed. This sample was subjected to $^{13}$C solid NMR spectroscopy by the CP/MAS method and DD/MAS method. For the $^{13}$C solid NMR spectroscopy, use can be made, for example, of CMX-300, manufactured by Chemagnetics Inc. Examples of the measuring conditions are shown below.

Reference: polydimethylsiloxane (internal reference: 1.56 ppm)

Sample rotation speed: 10.5 kHz

Pulse repetition time: 100 s

The spectrum obtained was subjected to peak separation to obtain peaks assigned to carbon atoms to which the functional groups had respectively been bonded, and the proportions of functional groups were determined from the areas of the peaks obtained.

(Membrane Permeation Flux)

The rate of permeation of feed water through the membrane was expressed in terms of water permeation rate (m$^3$) per membrane area of m$^2$ per day and this rate was taken as the membrane permeation flux (m$^3$/m$^2$/day).

(Boron Removal Ratio)

The feed water and the permeate were analyzed for boron concentration with an ICP emission spectrometer (P-4010, manufactured by Hitachi Ltd.), and the boron removal ratio was determined using the following equation.

Boron removal ratio (%)=100×{1−(boron concentration in permeate)/(boron concentration in feed water)}

(Solute Removal Ratio (TDS Removal Ratio)

TDS removal ratio (%)=100×{1−(TDS concentration in permeate)/(TDS concentration in feed water)}

(Oxidation Resistance Test)

In a 25° C. atmosphere, the composite semipermeable membrane was immersed for 20 hours in 100 mg/L aqueous sodium hypochlorite solution having a pH adjusted to 6.5. Thereafter, the composite semipermeable membrane was immersed in 10 mg/L aqueous sodium hydrogen sulfite solution for 10 minutes, subsequently sufficiently rinsed with water, and then evaluated for boron removal ratio, thereby determining the oxidation resistance.

(Acid Resistance Test)

In a 25° C. atmosphere, the composite semipermeable membrane was immersed for 20 hours in an aqueous sulfuric acid solution having a pH adjusted to 1. Thereafter, the composite semipermeable membrane was sufficiently rinsed with water and evaluated for boron removal ratio, thereby determining the acid resistance.

Reference Example 1

A 16.0% by weight DMF solution of a polysulfone (PSf) was cast in a thickness of 200 μm on nonwoven polyester fabric (air permeability, 2.0 cc/cm$^2$/sec) under the conditions of 25° C., and this nonwoven fabric was immediately immersed in pure water and allowed to stand therein for 5 minutes, thereby producing a porous supporting membrane.

Comparative Examples 1 to 3

In accordance with the method described in International Publication WO 2011/105278, the porous supporting membrane obtained in Reference Example 1 was immersed in a 3% by weight aqueous solution of m-phenylenediamine (m-PDA) for 2 minutes and then slowly pulled up vertically, and nitrogen was blown thereagainst from an air nozzle to remove the excess aqueous solution from the surfaces of the supporting membrane. Thereafter, a 45° C. Isoper M (manufactured by Exxon Mobil Corp.) solution containing 0.165% by weight trimesoyl chloride (TMC) was applied to a surface of the membrane so that the surface was completely wetted. Subsequently, this membrane was heated in a 100°

C. oven so as to result in a residual solvent ratio of 80%, thereby obtaining a composite semipermeable membrane. This composite semipermeable membrane was regarded as a base membrane and examined for membrane permeation flux and boron removal ratio (Comparative Example 1).

The composite semipermeable membrane obtained in Comparative Example 1 was immersed in 1% by weight aqueous potassium peroxysulfate solution for a predetermined period (10 seconds in Comparative Example 2; 2 hours in Comparative Example 3), immersed in 0.1% by weight aqueous sodium hydrogen sulfite solution for 10 minutes, and then rinsed with water. The composite semipermeable membrane obtained was analyzed by XPS and solid NMR spectroscopy to calculate (content of substituents having structures of formula (1): —NXY and formula (2): —NXYZ)/(content of amide groups) as A/B and (content of amide groups)/[(content of terminal amino groups)+(content of terminal carboxyl groups)+(content of substituents having structures of formula (1) and formula (2))] as B/(A+C+D), and was examined for membrane permeation flux and boron removal ratio. Thereafter, the composite semipermeable membrane was further subjected to oxidation resistance and acid resistance tests and examined for boron removal ratio.

Examples 1 and 2

The composite semipermeable membrane obtained in Comparative Example 1 was immersed in 1% by weight aqueous potassium peroxysulfate solution for a predetermined period (5 minutes in Example 1; 30 minutes in Example 2), immersed in 0.1% by weight aqueous sodium hydrogen sulfite solution for 10 minutes, and then rinsed with water. The composite semipermeable membrane obtained was analyzed by XPS and solid NMR spectroscopy to calculate (content of substituents having structures of formula (1): —NXY and formula (2): —NXYZ)/(content of amide groups) as A/B and (content of amide groups)/[(content of terminal amino groups)+(content of terminal carboxyl groups)+(content of substituents having structures of formula (1) and formula (2))] as B/(A+C+D), and was examined for membrane permeation flux and boron removal ratio. Thereafter, the composite semipermeable membrane was further subjected to oxidation resistance and acid resistance tests and examined for boron removal ratio.

Examples 3 to 6

The composite semipermeable membrane obtained in Comparative Example 1 was immersed for 1 minute in a 1,000 mg/L hexane solution of a sulfonyl chloride (benzenesulfonyl chloride in Example 3; methanesulfonyl chloride in Example 4; p-toluenesulfonyl chloride in Example 5; o-nitrobenzenesulfonyl chloride in Example 6) and then rinsed with hexane and water in this order.

The composite semipermeable membrane obtained was analyzed by XPS and solid NMR spectroscopy to calculate (content of substituents having structures of formula (1): —NXY and formula (2): —NXYZ)/(content of amide groups) as A/B and (content of amide groups)/[(content of terminal amino groups)+(content of terminal carboxyl groups)+(content of substituents having structures of formula (1) and formula (2))] as B/(A+C+D), and was examined for membrane permeation flux and boron removal ratio. Thereafter, the composite semipermeable membrane was further subjected to oxidation resistance and acid resistance tests and examined for boron removal ratio.

Comparative Example 4

In accordance with the method described in International Publication WO 2011/105278, the porous supporting membrane obtained in Reference Example 1 was immersed in a 3% by weight aqueous solution of m-phenylenediamine (m-PDA) for 2 minutes and then slowly pulled up vertically, and nitrogen was blown thereagainst from an air nozzle to remove the excess aqueous solution from the surfaces of the supporting membrane. Thereafter, a 45° C. decane solution containing 0.165% by weight trimesoyl chloride (TMC) was applied to a surface of the membrane so that the surface was completely wetted. This membrane was allowed to stand still for 10 seconds and then heated in a 120° C. oven for 15 seconds, thereby obtaining a composite semipermeable membrane. This composite semipermeable membrane was regarded as a base membrane and examined for membrane permeation flux and boron removal ratio.

Comparative Example 5

The composite semipermeable membrane obtained in Comparative Example 4 was immersed in 1% by weight aqueous potassium peroxysulfate solution for 30 minutes, immersed in 0.1% by weight aqueous sodium hydrogen sulfite solution for 10 minutes, and then rinsed with water. The composite semipermeable membrane obtained was analyzed by XPS and solid NMR spectroscopy to calculate (content of substituents having structures of formula (1): —NXY and the formula (2): —NXYZ)/(content of amide groups) as A/B and (content of amide groups)/[(content of terminal amino groups)+(content of terminal carboxyl groups)+(content of substituents having structures of formula (1) and formula (2))] as B/(A+C+D), and was examined for membrane permeation flux and boron removal ratio. Thereafter, the composite semipermeable membrane was further subjected to oxidation resistance and acid resistance tests and examined for boron removal ratio.

The results concerning the oxidation resistance and acid resistance of the composite semipermeable membranes obtained in Comparative Examples 1 to 5 and Examples 1 to 6 are shown in Table 1.

TABLE 1

| | A/B (content of substituents having structures of (1)—NXY and (2)—NXYZ)/(content of amide groups) | B/(A + C + D) (content of amide groups)/ [(content of amino groups) + (content of carboxyl groups) + (content of substituents having structures of (1)—NXY and (2)—NXYZ] | Membrane permeation flux (m³/m²/d) | Boron removal ratio (%) | Boron removal ratio after oxidation resistance test (%) | Boron removal ratio after acid resistance test (%) |
|---|---|---|---|---|---|---|
| Comp. Ex. 1 | — | 1.4 | 0.89 | 90 | 79 | 82 |
| Comp. Ex. 2 | 0.003 | | 0.90 | 90 | 81 | 84 |
| Comp. Ex. 3 | 0.19 | | 0.79 | 91 | 89 | 90 |

TABLE 1-continued

| | A/B (content of substituents having structures of (1)—NXY and (2)—NXYZ)/(content of amide groups) | B/(A + C + D) (content of amide groups)/ [(content of amino groups) + (content of carboxyl groups) + (content of substituents having structures of (1)—NXY and (2)—NXYZ)] | Membrane permeation flux (m³/m²/d) | Boron removal ratio (%) | Boron removal ratio after oxidation resistance test (%) | Boron removal ratio after acid resistance test (%) |
|---|---|---|---|---|---|---|
| Ex. 1 | 0.06 | | 0.92 | 92 | 84 | 89 |
| Ex. 2 | 0.11 | | 0.89 | 91 | 88 | 90 |
| Ex. 3 | 0.08 | | 0.91 | 91 | 88 | 90 |
| Ex. 4 | 0.07 | | 0.89 | 90 | 87 | 87 |
| Ex. 5 | 0.10 | | 0.88 | 91 | 89 | 90 |
| Ex. 6 | 0.07 | | 0.89 | 90 | 89 | 89 |
| Comp. Ex. 4 | — | 1 | 0.90 | 86 | 72 | 78 |
| Comp. Ex. 5 | 0.23 | | 0.75 | 88 | 87 | 87 |

Comparative Example 6

The porous supporting membrane obtained in Reference Example 1 was immersed for 2 minutes in a water/acetonitrile mixed solvent (1:1 (v/v)) solution containing sodium hydroxide and 1,3-diamino-4-benzenesulfonic acid in a concentration of 0.2 mol/L each. Thereafter, the supporting membrane was slowly pulled up vertically, and nitrogen was blown thereagainst from an air nozzle to remove the excess aqueous solution from the surfaces of the supporting membrane. Furthermore, a 25° C. decane solution containing 0.165% by weight trimesoyl chloride (TMC) was applied to a surface of the membrane so that the surface was completely wetted. This membrane was allowed to stand still for 10 seconds and then allowed to stand still in a 25° C. oven for 120 seconds, thereby obtaining a composite semipermeable membrane. The composite semipermeable membrane obtained was examined for membrane permeation flux and TDS removal ratio just after the production and further examined for TDS removal ratio after evaluation of the oxidation resistance. In the polyamide functional layer, neither clear protrusions nor clear recesses were observed.

Comparative Example 7

The porous supporting membrane obtained in Reference Example 1 was immersed for 2 minutes in a 1:1 water/acetonitrile mixed solvent (1:1 (v/v)) solution containing 1,3-diamino-4-thioanisole in a concentration of 0.2 mol/L. Thereafter, the supporting membrane was slowly pulled up vertically, and nitrogen was blown thereagainst from an air nozzle to remove the excess aqueous solution from the surfaces of the supporting membrane. Furthermore, a 25° C. decane solution containing 0.165% by weight trimesoyl chloride (TMC) was applied to a surface of the membrane so that the surface was completely wetted. This membrane was allowed to stand still for 10 seconds and then allowed to stand still in a 25° C. oven for 120 seconds, thereby obtaining a composite semipermeable membrane. The composite semipermeable membrane obtained was examined for membrane permeation flux and TDS removal ratio just after the production and further examined for TDS removal ratio after evaluation of the oxidation resistance.

Example 7

The porous supporting membrane obtained in Reference Example 1 was immersed for 2 minutes in a 1:1 water/acetonitrile mixed solvent (1:1 (v/v)) solution containing 1,3-diamino-4-thioanisole in a concentration of 0.2 mol/L. Thereafter, the supporting membrane was slowly pulled up vertically, and nitrogen was blown thereagainst from an air nozzle to remove the excess aqueous solution from the surfaces of the supporting membrane. Furthermore, a 25° C. decane solution containing 0.165% by weight/trimesoyl chloride (TMC) was applied to a surface of the membrane so that the surface was completely wetted. This membrane was allowed to stand still for 10 seconds and then allowed to stand still in a 25° C. oven for 120 seconds. The composite semipermeable membrane obtained was immersed for 30 minutes in 1% by weight aqueous hydrogen peroxide solution having a pH of 3, thereby conducting an oxidation treatment to convert the methylthio groups into methanesulfonyl groups. Thereafter, the composite semipermeable membrane was immersed in 0.1% by weight aqueous sodium hydrogen sulfite solution for 10 minutes and then immersed in RO water for 10 minutes, thereby obtaining a composite semipermeable membrane.

The composite semipermeable membrane obtained was examined for membrane permeation flux and TDS removal ratio just after the production and further examined for TDS removal ratio after evaluation of the oxidation resistance. The heights of the protrusions of the polyamide functional layer had a median value of 70 nm.

Example 8

A composite semipermeable membrane was obtained by conducting the same procedure as in Example 7, except that the treatment with an aqueous hydrogen peroxide solution was performed for 24 hours. The composite semipermeable membrane obtained was examined for membrane permeation flux and TDS removal ratio just after the production and further examined for TDS removal ratio after evaluation of the oxidation resistance.

The "Hammett's constants ($\sigma_m$, $\sigma_p$) of the substituent of the amine", "Hammett's constants ($\sigma_m$, $\sigma_p$) of the substituent formed through chemical conversion", and "oxidation treatment period" in each of Comparative Examples 6 and 7 and Examples 7 and 8 are summarized in Table 2. The results concerning the oxidation resistance of the composite semipermeable membranes obtained in Comparative Examples 6 and 7 and Examples 7 and 8 are shown in Table 3.

TABLE 2

| | Hammett's constants of substituent of amine | | Hammett's constants of substituent formed through chemical conversion | | Oxidation treatment period |
|---|---|---|---|---|---|
| | $\sigma_m$ | $\sigma_p$ | $\sigma_m$ | $\sigma_p$ | period |
| Comparative Example 6 | 0.30 | 0.35 | — | — | — |

TABLE 2-continued

| | Hammett's constants of substituent of amine | | Hammett's constants of substituent formed through chemical conversion | | Oxidation treatment period |
|---|---|---|---|---|---|
| | $\sigma_m$ | $\sigma_p$ | $\sigma_m$ | $\sigma_p$ | |
| Comparative Example 7 | 0.15 | 0.00 | — | — | — |
| Example 7 | 0.15 | 0.00 | 0.60 | 0.72 | 30 min |
| Example 8 | 0.15 | 0.00 | 0.60 | 0.72 | 24 hr |

TABLE 3

| | [A/B] (content of substituents having structures of (1): —NXY and (2): —NXYZ)/(content of amide groups) | Membrane permeation flux (m³/m²/d) | TDS removal ratio (%) | TDS removal ratio after oxidation resistance test (%) |
|---|---|---|---|---|
| Comparative Example 6 | — | 0.21 | 90.5 | 84.2 |
| Comparative Example 7 | — | 0.4 | 97.2 | 73.2 |
| Example 7 | 0.06 | 0.45 | 98.7 | 97.2 |
| Example 8 | 0.13 | 0.49 | 98.9 | 98.1 |

As shown in Table 1 and Table 3, it was understood that the composite semipermeable membranes according to the present invention had high oxidation resistance or acid resistance while substantially retaining the membrane permeation flux.

INDUSTRIAL APPLICABILITY

The composite semipermeable membrane of the present invention is especially suitable for use in the desalination of seawater or brackish water.

While the invention has been described in detail and with reference to specific embodiments thereof, it will be apparent to one skilled in the art that various changes and modifications can be made therein without departing from the spirit and scope thereof. This application is based on a Japanese patent application filed on Dec. 26, 2014 (Application No. 2014-264343), the entire contents thereof being incorporated herein by reference.

DESCRIPTION OF REFERENCE NUMERALS AND SIGNS

1 Separation functional layer

The invention claimed is:

1. A composite semipermeable membrane comprising a supporting membrane and a separation functional layer disposed on the supporting membrane,
   wherein the separation functional layer comprises an aromatic polyamide,
   the aromatic polyamide has side chains and terminal groups, at least one of the side chains and terminal groups of the aromatic polyamide being an amino group,
   at least one of the side chains and terminal groups of the aromatic polyamide is a substituent having a structure represented by the following formula:

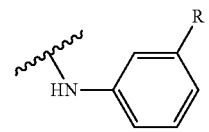

in which R is —NO₂ or —NHOH, and
   in the aromatic polyamide, a content A of substituents having structures represented by the formula and a content B of amide groups satisfy 0.005≤A/B≤0.15,
   in the aromatic polyamide, the content A of the substituents having structures represented by the formula, the content B of amide groups, a content C of terminal carboxyl groups, and a content D of terminal amino groups satisfy 1.3≤B/(A+C+D).

2. The composite semipermeable membrane according to claim 1, wherein the separation functional layer comprising the aromatic polyamide has a protuberance structure, the protuberance structure has protrusions, and a median value of heights of the protrusions is 50 nm or larger.

* * * * *